Oct. 12, 1926.
R. E. BASTIAN
1,602,477
CHILD'S VEHICLE
Filed March 3, 1924
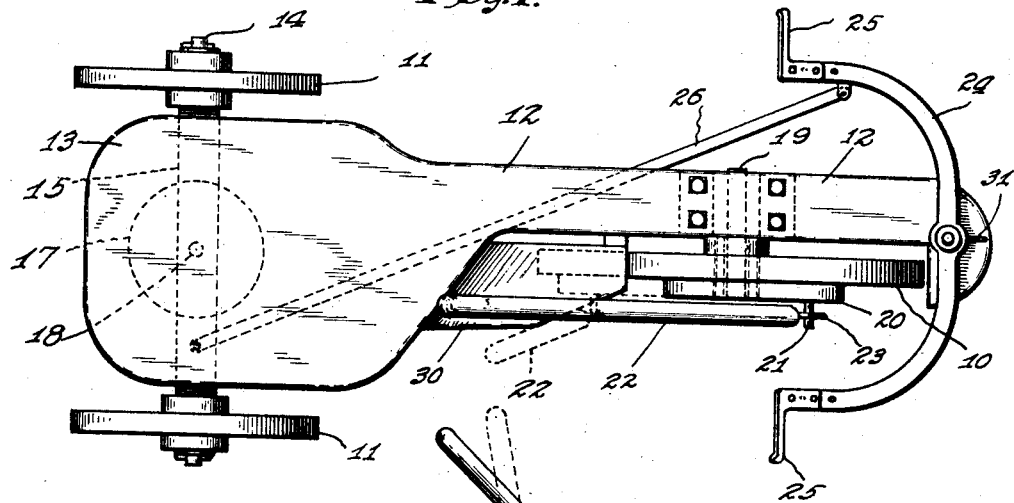
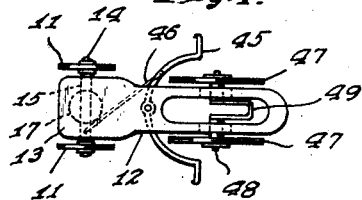
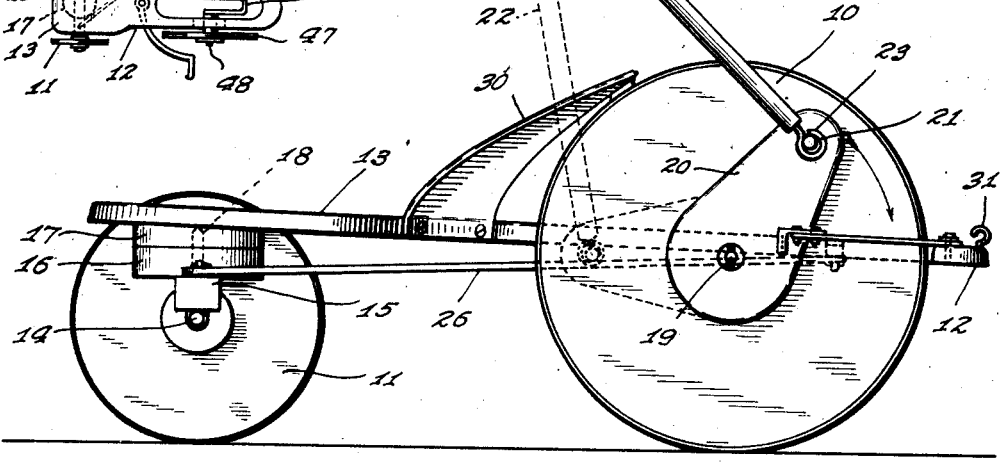
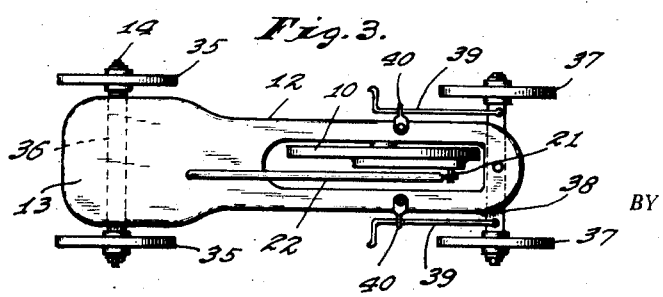
INVENTOR.
RICHMOND E. BASTIAN,
BY
ATTORNEY.

Patented Oct. 12, 1926.

1,602,477

UNITED STATES PATENT OFFICE.

RICHMOND E. BASTIAN, OF INDIANAPOLIS, INDIANA.

CHILD'S VEHICLE.

Application filed March 3, 1924. Serial No. 696,460.

It is the object of my invention to provide a simple and economically constructed occupant-propelled child's vehicle, provided with a novel driving means which will operate with a minimum of effort.

I accomplish my object by providing a suitable vehicle with a rotatable driving element upon which is eccentrically mounted a driving rod extending directly to the hand or hands of the occupant.

The accompanying drawing illustrates my invention: Figs. 1 and 2 are a plan and side elevation respectively, illustrating the application of my invention to a three wheel vehicle, which is the preferred form; Fig. 3 is a modification showing my invention applied to a five wheel vehicle; and Fig. 4 another modification showing a four wheel vehicle embodying my invention.

In the preferred form of my invention as illustrated in Figs. 1 and 2, the vehicle is provided with but three wheels—the front, or driving wheel 10, and two rear, or steering wheels 11. These wheels serve to support a reach 12, the rear part of which is widened to form a seat 13. The two rear wheels 11 are rotatably mounted on a suitable axle 14, preferably provided with an axle-reinforcing member 15, extending between the wheels 11, which axle-reinforcing member carries a bolster 16 co-operating with a second bolster 17 fixed on the bottom of the seat 13. The rear axle 14 with its attached bolster 16 is pivotally mounted relative to the reach 12, as by means of a pivot pin 18 located partly in the upper bolster 17 and partly in the lower bolster 16. A stud shaft 19 mounted on the reach 12 carries the front or driving wheel 10 which is provided with a reinforcing member 20 upon which is mounted an eccentric pin 21. The reinforcing member 20 is not essential to my invention as the pin 21 may be mounted directly on the side of the wheel 10. The driving wheel is driven by a suitable rod 22 pivotally connected to the eccentric pin 21 as by a screw-eye 23 and said connections provide for movement of the rod in all directions with respect to the driving wheel so that the latter may be operated without danger of the rod striking and possibly injuring the occupant of the vehicle. This rod 22 is free to extend upward and rearward from the pin 21 between the feet of the occupant of the vehicle and in position to be grasped in the hands of the occupant.

Pivotally mounted on the front end of the reach 12 is a steering bar 24 provided at its ends with suitable foot rests 25. As shown, the steering bar 24 is curved so as to embrace the driving wheel and bring the foot rests 25 closer to the seat, but such curvature may not be necessary in all cases. A link 26 is provided to connect the steering bar 24 with the pivoted rear axle. As shown, this link extends from a point close to the left hand end of the steering bar 24 to a point on the rear axle which is to the right of the pivot 18. It is not necessary that the link 26 extend from one side of the steering bar to the opposite side of the rear axle; but if the vehicle is so constructed, the steering is performed in the natural manner—i. e., moving the left end of the steering bar forward turns the vehicle to the right.

To further insure that the rod 22 will not strike the occupant of the vehicle, there may be mounted on the reach 12 a suitable guard 30 of light sheet metal or other material, which guard serves the purpose of moving the rod laterally of the vehicle so as to prevent said rod from coming directly in front of the occupant, particularly during upward movement of the rod. The guard 30 is not essential to my invention, as the driving rod 22 is free to move in all directions with respect to the driving wheel and, moreover, said rod may be made long enough to extend over the shoulder of the occupant, thus further eliminating any possibility of injury from this source.

As shown in Figs. 1, 2, and 3, the driving rod 22 is detachably mounted on the eccentric pin 21, but such a detachable mounting is not essential to my invention. However, by connecting the driving rod 22 to the eccentric pin 21 in the manner shown and by providing at the front end of the reach 12 a suitable hook 31, the driving rod may be detached from the pin 21, connected to the hook 31, and used as a tongue to draw the vehicle.

In the modification of my invention shown in Fig. 3, the vehicle is provided with five wheels—four supporting wheels and a driving wheel. The rear wheels 35 are mounted on a fixed axle 36 and the front wheels 37 are mounted on a pivoted axle 38. Suitable steering rods 39 extend rearwardly from each end of the axle so as to embrace the driving wheel and said rods are supported on the reach 12 by guides 40. The driving wheel 10 and its driving rod 22 are arranged in the same manner as the corresponding parts shown in Figs. 1 and 2.

In the modification shown in Fig. 4, the rear wheels 11 and the rear axle 14 are arranged as are the corresponding parts in the vehicle shown in Figs. 1 and 2. A pivoted steering bar 45 embraces the driving wheel and is connected by a link 46 to the rear axle just as the steering bar 24 in Fig. 1 is connected to the rear axle by the link 26. There are two front wheels 47 carried by a front axle 48 which extends across the front of the vehicle and which, near its center, is provided with a crank 49. One of the front wheels 47 constitutes the driving wheel and is rigidly attached to the axle 48, but I prefer to mount the other wheel 47 so that it is free to rotate on the axle in order to avoid wheel slippage when turning corners. A driving rod (not shown), similar to the driving rod 22 shown in Figs. 1, 2, and 3, is attached to the crank 49.

In all the modifications, the vehicle is driven by a rotatable driving element on which is eccentrically mounted a driving rod. In operation, the occupant takes his position on the vehicle with his feet on the steering bar or the steering rods and grasps the driving rod 22 in his hands. By moving the driving rod up and down, the driving element is rotated, and the vehicle progresses. As the driving rod 22 is adapted to be grasped by both hands of the occupant and as the occupant can move the upper end of the driving rod forward or backward through a considerable range, the driving mechanism has no dead center.

I claim as my invention:—

1. An occupant-propelled vehicle having a plurality of supporting wheels, a driving wheel located adjacent the front of the vehicle, and a driving wheel operating rod movable in all directions and arranged to be grasped by the occupant of the vehicle.

2. An occupant propelled vehicle having a plurality of supporting wheels, a driving wheel located adjacent the front of the vehicle, a driving wheel operating rod arranged to be grasped by the occupant of the vehicle, and a connection between the rod and the wheel providing for movement of said rod in all directions.

3. An occupant propelled vehicle having a pair of supporting wheels at the rear thereof, a driving wheel located adjacent the front of the vehicle, and a hand rod for operating the driving wheel mounted thereon for movement in all directions.

4. An occupant propelled vehicle having a driving wheel and a plurality of supporting wheels, a driving wheel operating rod movable in all directions and arranged to be grasped by the occupant of the vehicle, and means for turning a pair of said supporting wheels to steer the vehicle.

5. In an occupant-propelled wheeled vehicle, the combination of a driving wheel and a driving rod therefor extending upwardly from the driving wheel in position to be grasped in the hands of the occupant, and a guard mounted on said vehicle adapted to impart movement to said rod laterally of the vehicle while the same is being propelled by the rod and said driving wheel.

6. An occupant-propelled vehicle having a driving wheel mounted near one extremity thereof, an axle pivotally mounted near the opposite extremity of said vehicle, means for turning said axle on its pivotal mounting, a supporting wheel on each end of the axle, and means movable in all directions for driving said driving wheel.

7. An occupant-propelled vehicle having a driving wheel mounted near the front thereof, a driving rod for said driving wheel movable in all directions with respect thereto, an axle pivotally mounted near the rear of said vehicle, means for turning the axle on its pivotal mounting, and a supporting wheel on each end of said axle.

8. An occupant-propelled vehicle having a driving wheel mounted near one extremity thereof, means for driving said driving wheel, an axle pivotally mounted near the opposite extremity of said vehicle, a supporting wheel on each end of said axle, steering means pivotally mounted near the driving wheel and embracing the same, and a link connecting said steering means and said axle.

9. An occupant-propelled vehicle having a driving wheel mounted near one extremity thereof, means for driving said driving wheel, an axle pivotally mounted near the opposite extremity of said vehicle, a supporting wheel on each end of said axle, a pivotally mounted steering bar extending transversely of the vehicle, and a link extending diagonally across the vehicle and connected with the steering bar and axle adjacent opposite extremities of said bar and axle.

10. In an occupant propelled vehicle, the combination of a plurality of supporting wheels, a rotatable ground engaging element located adjacent the front of the vehicle, and a rod movable in all directions for operating said element and arranged to be grasped by the occupant of the vehicle.

11. In an occupant propelled vehicle, the combination of a plurality of supporting wheels, a rotatable ground-engaging element located adjacent the front of the vehicle, and an operating rod mounted on the ground-engaging element for movement in all directions and extending from said element so as to be grasped by the occupant of the vehicle.

12. In an occupant propelled vehicle provided with tongue attaching means, the combination of a pair of rear supporting wheels, a ground engaging driving wheel located adjacent the front of the vehicle, and a combined driving wheel operating rod and tongue detachably mounted on the driving wheel and adapted to be connected with said tongue attaching means.

13. In an occupant propelled vehicle, the combination of a plurality of supporting wheels, a driving wheel mounted adjacent the front of the vehicle and fixed against pivotal movement with respect thereto, and a driving wheel operating rod mounted on said driving wheel and arranged to extend rearwardly from the latter so as to be grasped by the occupant of the vehicle.

14. The combination with an occupant-propelled vehicle having a driving wheel, of a driving wheel operating rod arranged to extend between the feet of the occupant of the vehicle and mounted for movement in all directions with respect to said driving wheel.

15. The combination with an occupant-propelled vehicle having a driving wheel, of a driving wheel operating rod arranged to extend between the feet of the occupant of the vehicle and eccentrically connected with said driving wheel for movement in all directions with respect thereto.

16. In an occupant propelled vehicle, the combination of a driving wheel disposed adjacent the front of the vehicle, a pair of steering wheels located adjacent the rear of the vehicle, and a driving wheel operating rod mounted on the driving wheel and extending therefrom so as to be grasped by the occupant of the vehicle.

17. In an occupant propelled vehicle, the combination of a driving wheel disposed adjacent the front of the vehicle, a pair of supporting wheels at the rear of the vehicle, a hand rod eccentrically mounted on said driving wheel for operating the latter, and means for turning said pair of supporting wheels to steer the vehicle.

18. In an occupant-propelled vehicle, the combination of a driving wheel, a pair of steering wheels, foot-operated means for turning said pair of wheels to steer the vehicle, and means for driving the driving wheel comprising a manually operated element arranged to extend between the feet of the occupant of the vehicle and eccentrically connected with said driving wheel.

In witness whereof, I have hereunto set my hand at Indianapolis, Indiana, this 25th day of February, A. D. one thousand nine hundred and twenty-four.

RICHMOND E. BASTIAN.